April 18, 1961 W. E. WESTBROOK 2,979,825

PIPE AND TUBE GAUGE

Filed Oct. 20, 1958

INVENTOR.
WILLIAM E. WESTBROOK
BY Hudson, Boughton
Williams, David & Hoffmann
ATTORNEYS United States Patent Office 2,979,825
Patented Apr. 18, 1961

2,979,825

PIPE AND TUBE GAUGE

William E. Westbrook, 7714 Whittington Drive, Parma, Ohio

Filed Oct. 20, 1958, Ser. No. 768,109

2 Claims. (Cl. 33—148)

The present invention relates to measuring devices, and more particularly, to a tool or gauge for measuring pipes and tubes.

The object of the invention is to provide a new and improved measuring device comprising a straight-edge-like member provided adjacent to one at its ends with a quadrant projecting from one edge and having indicia or scales thereon indicating standard pipe sizes, tube sizes, and actual outside and inside diameters of pipes and tubes or other hollow articles and a second straight-edge-like member pivoted to the first member concentric with the quadrant of the first member and having indicator means thereon for cooperation with the indicia or scales on the first mentioned member to indicate the size of a pipe or tube inserted between said members or into which the free ends of the members are inserted.

The invention resides in certain constructions, and arrangements and combinations of parts, and further objects and advantages will become apparent to those skilled in the art to which it relates from the following description of the preferred embodiment described with reference to the accompanying drawing forming a part of this specification, in which similar reference characters designate corresponding parts, and in which.

Figure 1:
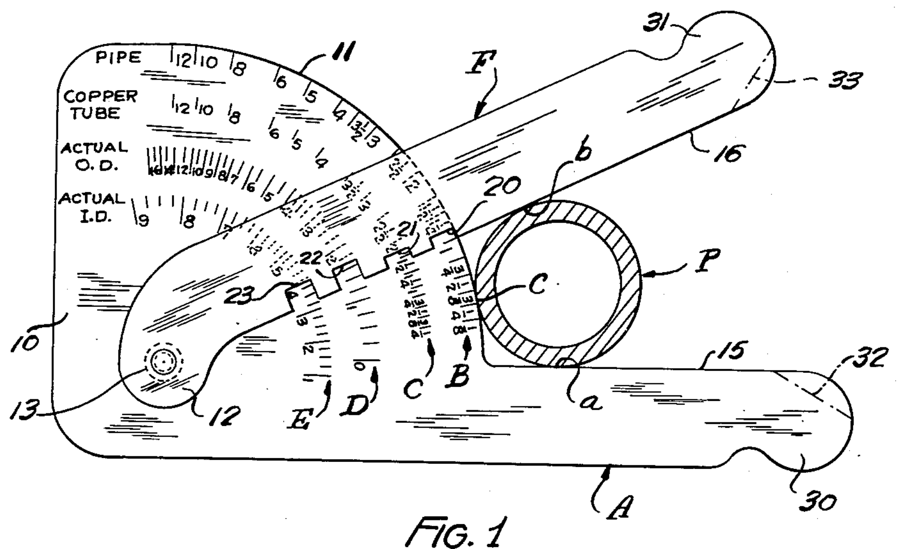
Fig. 1 is a plan view of a gauge embodying the invention.

Although the preferred embodiment of the invention shown is herein described in detail, it is to be understood that the invention is not limited to the construction and arrangement of the parts shown and described, but is capable of being otherwise embodied and of being practiced and carried out in various ways. It is also to be understood that the phraseology or terminology employed herein is for the purpose of description and not of limitation, and that there is no intention to thereby limit the invention beyond the requirements of the prior art.

Referring to the drawing, the reference character A designates a straight-edge-like member including a quadrant 10 projecting from its left-hand upper edge as viewed in the drawing. The member A is preferably made from a thin but rigid sheet of plastic or metal, preferably aluminum. The quadrant 10 is provided with four arcuate shaped scales designed generally as B, C, D and E, the graduations of which designate or indicate standard pipe and tube sizes, and actual outside and inside diameters of pipes and tubes, respectively, in inches and/or fractions thereof. The scale B is adjacent to the arcuate edge 11 of the quadrant 10 and the other scales are located between the scale B and the center of the quadrant.

The reference character F designates generally a second straight-edge-like member, preferably made of material similar to that of the member A, and having a downwardly extending projection or portion 12 at its left-hand end pivotally connected as by a rivet 13 to the member A at the center of the quadrant 10. The location of the pivot and the construction is otherwise such that the upper edge 15 of the member A and the lower edge 16 of the member B intersect the center of the pivot formed by the rivet 13.

In the embodiment shown, the edge 16 of the member B is provided with four rectangular apertures or notches 20, 21, 22 and 23, located at distances from the center of the pivot 13 to the scales B, C, D, and E, respectively, and the portions of the edge 16 of the member adjacent thereto constitute or form indicator means for cooperation with the scales B, C, D and E, respectively, to indicate the size of the pipe, tube or other article being measured. The numerals of the scales are located closely adjacent to but at the lower or right-hand sides of the graduations with which they are read, and the first two notches 20, 21 which, as shown, are of equal depth, are relatively shallow, having an angular dimension less than the smallest graduations of the scales with which they cooperate. The construction is such that when scales B and C are being used, the graduation being read will be readily visible, but the next higher graduation will not be visible. This facilitates the reading of the scales and reduces the possibility of error.

The notches 22, 23, which cooperate with scales D and E, are also alike in the embodiment shown, but deeper than the notches 20 and 21. The depth of these notches is such that they span two graduations. In other words, the following or next higher graduation to that being read is always visible. This permits ready interpolation between graduations. The scale D, for example, is graduated in quarter inches and if the portion of the edge 16 of the member F adjacent to or more particularly, immediately to the right of the scale in the embodiment shown, is one-half of the way between the fifth and sixth graduations, see Fig. 1, the actual outside diameter of the pipe P being measured is approximately one and three-eighths inches. Reference to scale B will show that the pipe is what is commonly referred to as a one inch pipe. As indicated above, the angular dimensions of the notches 22, 23 are not less than, or not substantially less than the maximum distance between graduations of the scale with which they cooperate.

The notches or apertures 20 to 23 are in effect windows and the result referred to could be accomplished by making the member F of transparent plastic or some such material and instead of forming notches in its lower edge, lines of contrasting color could be formed corresponding to the bottoms of the notches shown. In this event, it would be desirable to make at least the portions of the member F immediately above such lines opaque.

The right-hand free ends 30 and 31 of the members A and F are made semi-circular so that they can be used as inside calipers to measure the actual inside diameters of tubular articles. In the embodiment shown, the radii of these ends is three-eighths of an inch and the diameter of the article being measured (see Fig. 2) can be read on scale E. The lower edges 15 and 16 adjacent to the free ends of the members A and F may be cut away along the lines 32 and 33 so that the gauge shown will measure the inside diameter of an article having an inside diameter as small as approximately one-half inch.

Figure 2:
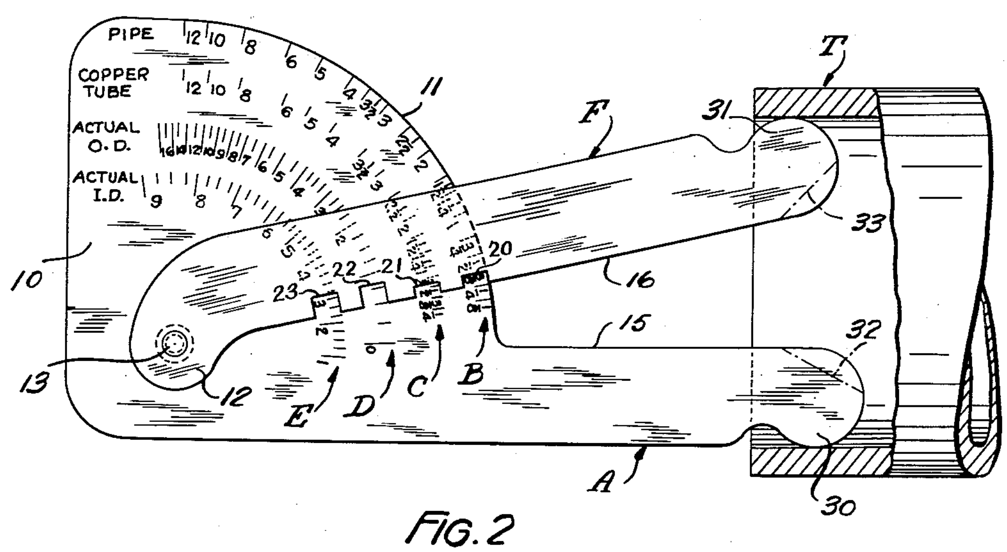
Fig. 2 is a view similar to Fig. 1, but showing the parts of the gauge in a different position.

The device is used to measure pipe and tube sizes and the actual outside diameters thereof or other round articles by placing the article to be measured between the edges 15 and 16 of the members A and F, and up against the arcuate edge 11 of the quadrant 10 which latter edge obviously serves as a stop to limit movement of the article toward the pivot formed by the rivet 13. The movable member F is rotated towards the member A so that the article being measured is contacted at three points, *a*, *b*, and *c*, by the gauge. The indicator means, that is the portions of the edge 16, immediately adjacent to the notches or windows 20, 21 and 22, will designate the proper size or dimension on the selected scale. From Fig. 1 it will be obvious that the device does not make a direct measurement of the outside diameter of the article being measured, nevertheless the diameter can be read on scale D. The manner in which the gauge is used to measure inside diameters of pipe, tubing, and other tubular articles has been described and is shown in Fig. 2, where the gauge is being used to measure a tube T.

From the foregoing description of the preferred embodiment of the invention described, it will be apparent that the objects heretofore enumerated and others have been accomplished and that there has been provided a new and improved measuring device for measuring tubular articles, and more particularly, pipes and tubes. While the preferred embodiment has been described in considerable detail, the invention is not limited to the particular construction shown and described, but it is the intention to hereby cover all modifications and adaptations thereof which come within the practice of those skilled in the art to which the invention relates and within the scope of the appended claims. For example, more or less scales than the four shown could be provided and the indicator edges or means together with their apertures or windows could be sealed above the opposite edge from that shown or spaced inwardly of both lower edges of the member F.

Having thus described my invention, I claim:

1. A measuring device of the character described for measuring the size and diameters of round hollow articles such as pipe and tubing, said device comprising a first straight-edge-like member having a quadrant adjacent to one end projecting from one edge, said quadrant having four scales thereon indicating standard pipe sizes, standard tube sizes, and actual outside and inside pipe and tube dimensions, respectively, and a second straight-edge-like member pivotally connected to said first member concentric with the center of said quadrant, the facing edges of said members being adapted to receive a pipe or tube therebetween, said second member having indicator means cooperating with said scales and apertures adjacent to said indicator means, the sides of said apertures adjacent to said indicating means being substantially straight and extending generally lengthwise of the scale with which the adjacent indicator means cooperate, said apertures adjacent to the indicator means cooperating with the first two mentioned scales having dimensions lengthwise of the scales with which they cooperate less than the distance between the smallest graduations thereof and said apertures adjacent to the indicator means cooperating with the last two mentioned scales having dimensions lengthwise of the scales with which they cooperate at least as great as the maximum distance between the graduations thereof, and the oppositely facing edges of the free ends of said members being semicircular and cooperating with one of said scales on said first member to measure the inside diameters of pipes and tubes.

2. A measuring device of the character described for measuring the size and diameters of round hollow articles such as pipe and tubing, said device comprising a first straight-edge-like member having a quadrant adjacent to one end projecting from one edge, said quadrant having four scales thereon indicating standard pipe sizes, standard tube sizes, and actual outside and inside pipe and tube dimensions, respectively, and a second straight-edge-like member pivotally connected to said first member concentric with the center of said quadrant, the facing edges of said members being adapted to receive a pipe or tube therebetween, said second member having indicator means cooperating with said scales, and windows adjacent to said indicator means, the sides of said windows adjacent to said indicating means being substantially straight and extending generally lengthwise of the scale with which the adjacent indicator means cooperate, said windows adjacent to the indicator means cooperating with the first two mentioned scales having dimensions lengthwise of the scales with which they cooperate less than the distance between the smallest graduations thereof and said windows adjacent to the indicator means cooperating with the last two mentioned scales having dimensions lengthwise of the scales with which they cooperate at least as great as the maximum distance between the graduations thereof, and the oppositely facing edges of the free ends of said members being semicircular and cooperating with one of said scales on said first member to measure the inside diameters of pipes and tubes.

References Cited in the file of this patent

UNITED STATES PATENTS

| | | |
|---|---|---|
| 1,345,071 | Butler | June 29, 1920 |
| 1,650,926 | Avery | Nov. 29, 1927 |
| 2,236,443 | Oboler | Mar. 25, 1941 |

FOREIGN PATENTS

| | | |
|---|---|---|
| 683 | Austria | Nov. 25, 1899 |
| 182,091 | Germany | Mar. 6, 1907 |